US012609917B2

(12) United States Patent
Akkapeddi et al.

(10) Patent No.:  US 12,609,917 B2
(45) Date of Patent:  *Apr. 21, 2026

(54) SYSTEM AND METHOD FOR REQUESTING DATA TRANSFERS IN A BLOCKCHAIN NETWORK

(71) Applicant: Bank of America Corporation, Charlotte, NC (US)

(72) Inventors: Naga Vamsi Krishna Akkapeddi, Charlotte, NC (US); Siten Sanghvi, Westfield, NJ (US)

(73) Assignee: Bank of America Corporation, Charlotte, NC (US)

( * ) Notice: Subject to any disclaimer, the term of this patent is extended or adjusted under 35 U.S.C. 154(b) by 214 days.

This patent is subject to a terminal disclaimer.

(21) Appl. No.: 18/415,264

(22) Filed: Jan. 17, 2024

(65) Prior Publication Data

US 2025/0233851 A1     Jul. 17, 2025

(51) Int. Cl.
| | |
|---|---|
| *H04L 9/40* | (2022.01) |
| *H04L 9/00* | (2022.01) |
| *H04L 9/32* | (2006.01) |

(52) U.S. Cl.
CPC ........ *H04L 63/0428* (2013.01); *H04L 9/3213* (2013.01); *H04L 9/50* (2022.05)

(58) Field of Classification Search
CPC ...... H04L 63/0428; H04L 9/50; H04L 9/3213
USPC ........................................................ 713/159
See application file for complete search history.

(56) References Cited

U.S. PATENT DOCUMENTS

| | | | |
|---|---|---|---|
| 10,938,548 | B2 | 3/2021 | Mercuri et al. |
| 11,194,961 | B2 | 12/2021 | Wang et al. |
| 11,244,313 | B2 | 2/2022 | Padmanabhan et al. |
| 11,288,280 | B2 | 3/2022 | Padmanabhan et al. |
| 11,397,919 | B1 | 7/2022 | Thiagrajan et al. |
| 11,449,476 | B2 | 9/2022 | Oberhofer et al. |
| 11,455,403 | B2 | 9/2022 | Shrinivasan et al. |
| 11,469,886 | B2 | 10/2022 | Padmanabhan |
| 11,568,437 | B2 | 1/2023 | Padmanabhan |
| 11,593,348 | B2 * | 2/2023 | Muse .................. G06F 16/2365 |
| 11,611,438 | B2 * | 3/2023 | Barakat ................ H04L 9/3236 |
| 11,770,445 | B2 | 9/2023 | Padmanabhan |
| 11,783,024 | B2 | 10/2023 | Padmanabhan |
| 11,803,537 | B2 | 10/2023 | Padmanabhan |
| 11,810,080 | B2 | 11/2023 | Lin et al. |
| 11,823,120 | B2 | 11/2023 | Padmanabhan |
| 2018/0225640 | A1 * | 8/2018 | Chapman ............. G06Q 20/401 |
| 2020/0175138 | A1 * | 6/2020 | Nordstrom .............. H04L 63/06 |

(Continued)

OTHER PUBLICATIONS

Naga Vamsi Krishna Akkapeddi, A system and method for allocating transfer of data from a data file, U.S. Appl. No. 18/415,189, filed Jan. 17, 2024, pp. 1-47.

*Primary Examiner* — Dant B Shaifer Harriman

(57) ABSTRACT

A processor receives a request to receive a transfer of a first amount of data objects into a first data file from a second data file. In response, the processor generates and transmits to the second data file a plurality of digital tokens amounting in value to the first amount of data object. The processor further transmits information associated with the first plurality of digital tokens. The processor receives the plurality of digital tokens and the first amount of data objects at the first data file from the second data file. In response, the processor determines that the requested data transfer has been completed.

20 Claims, 5 Drawing Sheets

500 —

(56) References Cited

U.S. PATENT DOCUMENTS

| | | | |
|---|---|---|---|
| 2020/0250747 A1 | 8/2020 | Padmanabhan | |
| 2020/0273048 A1* | 8/2020 | Andon | G06Q 10/02 |
| 2020/0351077 A1 | 11/2020 | Krishnaswamy et al. | |
| 2020/0380090 A1* | 12/2020 | Marion | G06F 21/6209 |
| 2021/0182423 A1 | 6/2021 | Padmanabhan | |
| 2021/0319431 A1* | 10/2021 | Yantis | G06Q 20/326 |
| 2022/0269693 A1* | 8/2022 | Shaked | H04L 9/50 |
| 2022/0321649 A1* | 10/2022 | Unagami | G06F 21/64 |
| 2023/0080808 A1 | 3/2023 | Padmanabhan | |
| 2023/0085481 A1 | 3/2023 | Padmanabhan | |
| 2023/0291544 A1 | 9/2023 | Turner et al. | |
| 2023/0351347 A1* | 11/2023 | Damrow | G06Q 20/36 |
| 2024/0195627 A1* | 6/2024 | Andon | H04L 9/3239 |
| 2024/0223371 A1* | 7/2024 | Narayanan | G06Q 30/0601 |
| 2024/0348449 A1* | 10/2024 | Lewander | H04L 9/3247 |
| 2024/0430091 A1* | 12/2024 | Barnes | G16H 10/60 |
| 2025/0223371 A1* | 7/2025 | Lotze | C12N 5/0636 |
| 2025/0233851 A1* | 7/2025 | Akkapeddi | H04L 9/3213 |
| 2025/0258895 A1* | 8/2025 | Andon | G06F 21/12 |

* cited by examiner

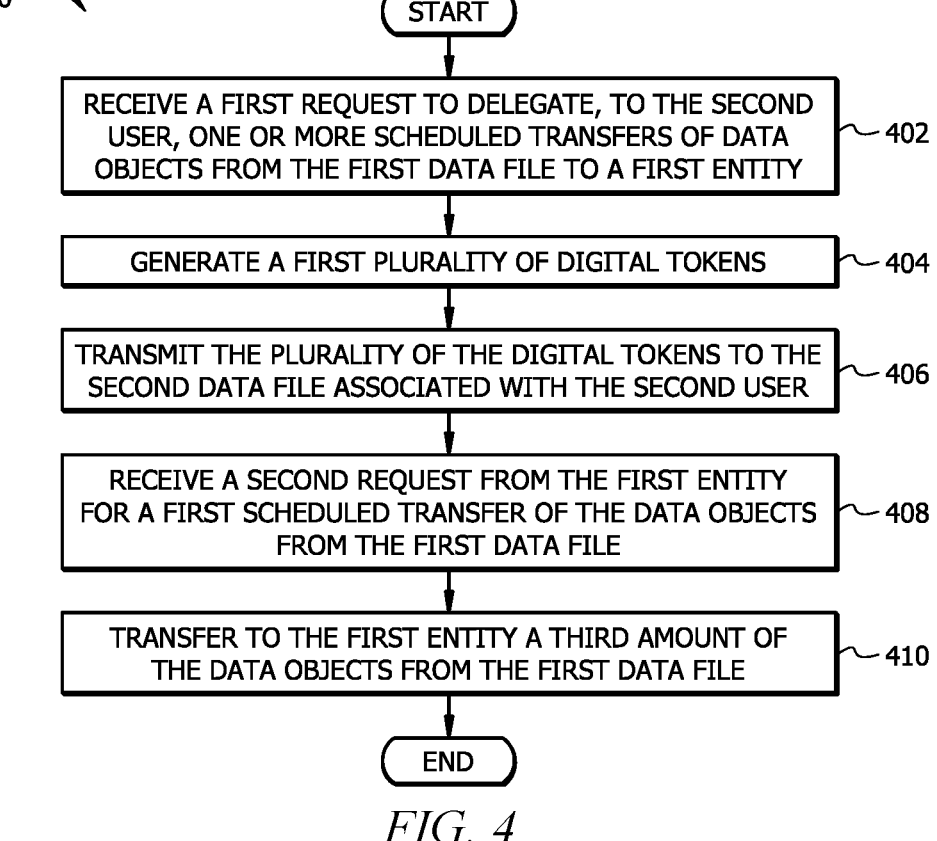

400

START

RECEIVE A FIRST REQUEST TO DELEGATE, TO THE SECOND USER, ONE OR MORE SCHEDULED TRANSFERS OF DATA OBJECTS FROM THE FIRST DATA FILE TO A FIRST ENTITY — 402

GENERATE A FIRST PLURALITY OF DIGITAL TOKENS — 404

TRANSMIT THE PLURALITY OF THE DIGITAL TOKENS TO THE SECOND DATA FILE ASSOCIATED WITH THE SECOND USER — 406

RECEIVE A SECOND REQUEST FROM THE FIRST ENTITY FOR A FIRST SCHEDULED TRANSFER OF THE DATA OBJECTS FROM THE FIRST DATA FILE — 408

TRANSFER TO THE FIRST ENTITY A THIRD AMOUNT OF THE DATA OBJECTS FROM THE FIRST DATA FILE — 410

END

*FIG. 4*

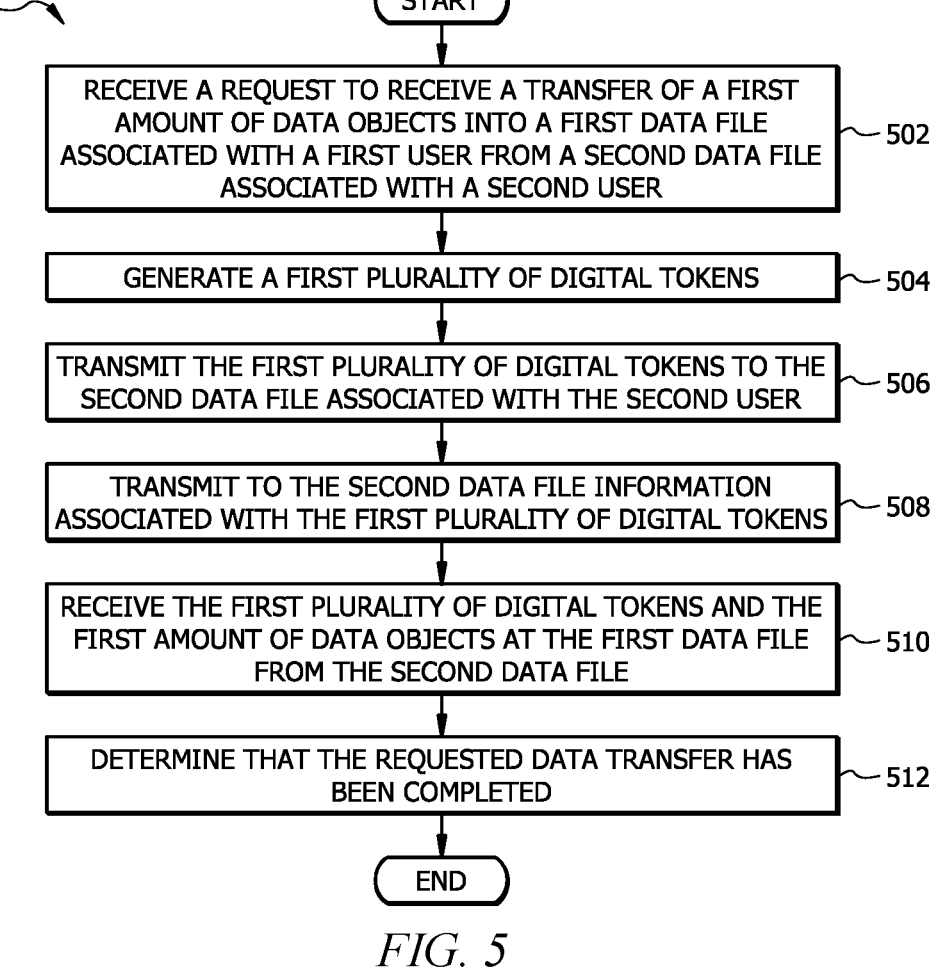

500

START

RECEIVE A REQUEST TO RECEIVE A TRANSFER OF A FIRST AMOUNT OF DATA OBJECTS INTO A FIRST DATA FILE ASSOCIATED WITH A FIRST USER FROM A SECOND DATA FILE ASSOCIATED WITH A SECOND USER — 502

GENERATE A FIRST PLURALITY OF DIGITAL TOKENS — 504

TRANSMIT THE FIRST PLURALITY OF DIGITAL TOKENS TO THE SECOND DATA FILE ASSOCIATED WITH THE SECOND USER — 506

TRANSMIT TO THE SECOND DATA FILE INFORMATION ASSOCIATED WITH THE FIRST PLURALITY OF DIGITAL TOKENS — 508

RECEIVE THE FIRST PLURALITY OF DIGITAL TOKENS AND THE FIRST AMOUNT OF DATA OBJECTS AT THE FIRST DATA FILE FROM THE SECOND DATA FILE — 510

DETERMINE THAT THE REQUESTED DATA TRANSFER HAS BEEN COMPLETED — 512

END

*FIG. 5*

SYSTEM AND METHOD FOR REQUESTING DATA TRANSFERS IN A BLOCKCHAIN NETWORK

TECHNICAL FIELD

The present disclosure relates generally to network communication, and more specifically to a system and method for requesting data transfers in a blockchain network.

BACKGROUND

A blockchain network generally implements distributed computing which generally refers to a method of making multiple computers work together to solve a common problem. This makes a computer network appear as a powerful single computer that provides large-scale resources to deal with complex challenges. For example, distributed computing can encrypt large volumes of data, solve complex physics and chemical equations with many variables, and render high-quality, three-dimensional video animation. A distributed ledger associated with the blockchain network records data interactions between two parties (e.g., users) efficiently and in a verifiable and permanent way. One or more data interactions may be performed within the blockchain network. For example, a data interaction may include transferring one or more data objects between data files stored in the distributed ledger.

SUMMARY

The system and method implemented by the system as disclosed in the present disclosure provide technical solutions to the technical problems discussed above by securely transmitting data within the blockchain network.

For example, the disclosed system and methods provide the practical application of securely setting up and implementing data transfers within a blockchain network. As described in embodiments of the present disclosure a transfer manager may use digital tokens generated in blockchain network to configure and implement data transfers within the blockchain network. In certain embodiments, digital tokens may be used to delegate data transfers from a first data file of a first user to a second user allowing the second user to use digital tokens to perform data transfers from the first data file on behalf of the first user. In other embodiments, digital tokens may be used to request and receive data transfers at a first data file from a second data file. By using digital tokens to configure and perform data transfers within the blockchain network, the disclosed system and methods provide a secure way to perform data transfers within the blockchain network. This improves data security associated with data transfers within a computing network and generally improves data security in a computing network.

The disclosed system and methods provide a further practical application of configuring and controlling data transfers within the blockchain network by implementing rules using a smart contract. A smart contract is generated to implement one or more rules defined by users associated with data transfers between data file. The transfer manager invokes and runs the smart contract to determine whether a requested data transfer satisfies the rules defined for the data transfer. The transfer manager allows the requested data transfer to take place only upon determining that the data transfer satisfies all defined rules. This further enhances data security associated with data transfers within a computing network.

Thus, the disclosed system and method generally improves blockchain technology.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 illustrates a flowchart of an example method for delegating a data transfer, in accordance with one or more embodiments of the present disclosure; and FIG. 5 illustrates a flowchart of an example method for requesting and receiving a data transfer, in accordance with one or more embodiments of the present disclosure.

DETAILED DESCRIPTION

Figure 1:
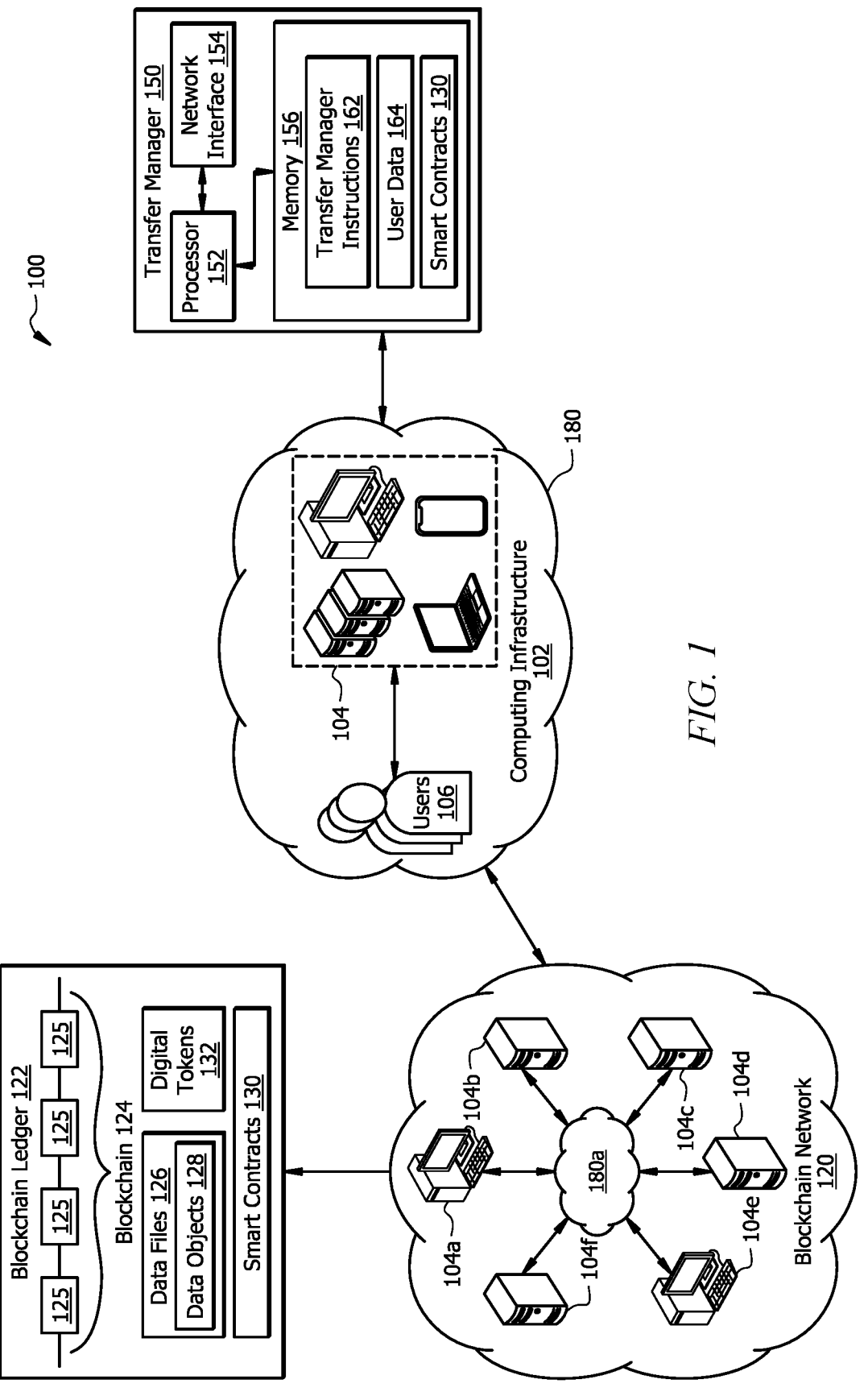
FIG. 1 is a schematic diagram of a system, in accordance with certain aspects of the present disclosure.

FIG. 1 is a schematic diagram of a system 100, in accordance with certain aspects of the present disclosure. As shown, system 100 includes a computing infrastructure 102 connected to a network 180. Computing infrastructure 102 may include a plurality of hardware and software components. The hardware components may include, but are not limited to, computing nodes 104 such as desktop computers, smartphones, tablet computers, laptop computers, servers and data centers, mainframe computers, virtual reality (VR) headsets, augmented reality (AR) glasses and other hardware devices such as printers, routers, hubs, switches, and memory all connected to the network 180. Software components may include software applications that are run by one or more of the computing nodes 104 including, but not limited to, operating systems, user interface applications, third party software, database management software, service management software, mainframe software, metaverse software, AI tools and other customized software programs (e.g., transfer manager 150) implementing particular functionalities. For example, software code relating to one or more software applications may be stored in a memory device and one or more processors (e.g., belonging to one or more computing nodes 104) may execute the software code to implement respective functionalities. An example software application run by one or more computing nodes 104 of the computing infrastructure 102 may include the transfer manager 150. In one embodiment, at least a portion of the 20 computing infrastructure 102 may be representative of an Information Technology (IT) infrastructure of an organization.

One or more of the computing nodes 104 may be operated by a user 106. For example, a computing node 104 may provide a user interface using which a user 106 may operate the computing node 104 to perform data interactions within the computing infrastructure 102.

One or more computing nodes 104 of the computing infrastructure 102 may be representative of a computing system which hosts software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality (e.g., transfer manager 150) as described below. In certain embodiments, one or more of the computing nodes 104 may run a thin client software application where the processing is directed by the thin client but largely performed by a central entity such as a server (not shown).

Network 180, in general, may be a wide area network (WAN), a personal area network (PAN), a cellular network, or any other technology that allows devices to communicate electronically with other devices. In one or more embodiments, network 180 may be the Internet.

At least a portion of the computing infrastructure 102 may include a blockchain network 120. For example, a portion of the computing nodes 104 may form the blockchain network 120. As shown in FIG. 1, example blockchain network 120 includes computing nodes 104a, 104b, 104c, 104d, 104e and 104f connected to each other via a portion of the network 180 (shown as 180a). The blockchain network 120 implements distributed computing which generally refers to a method of making multiple computers (e.g., computing nodes 104a-104f) work together to solve a common problem. This makes a computer network (e.g., blockchain network 120) appear as a powerful single computer that provides large-scale resources to deal with complex challenges. For example, distributed computing can encrypt large volumes of data, solve complex physics and chemical equations with many variables, and render high-quality, three-dimensional video animation. Distributed computing often uses specialized software applications that are configured to run on several computing nodes 104 instead of on just one computer, such that different computers perform different tasks and communicate to develop the final solution. High-performing distributed computing is often used in engineering research, financial services, energy sector and the like to run complex processes.

Blockchain network 120 may implement a blockchain 124 across a plurality of the computing nodes 104 (e.g., computing nodes 104a-104f). A blockchain (e.g., blockchain 124) generally is an open, decentralized and distributed digital ledger (e.g., blockchain ledger 122) consisting of records called blocks that are used to record data interactions across many computing nodes (e.g., computing nodes 104). Each computing node 104 of a blockchain network (e.g., blockchain network 120) may maintain a copy of the blockchain ledger (e.g., blockchain ledger 122). Logically, a blockchain is a chain of blocks which contains specific information. As shown in FIG. 1, blockchain 124 includes a chain of blocks 125. Once recorded, the data in any given block 125 cannot be altered retroactively without alteration of all subsequent blocks 125, which requires consensus of the network majority. Each computing node 104 within the blockchain network 120 maintains, approves, and updates new entries. The system is controlled not only by separate individuals, but by everyone within the blockchain network 120. Each member ensures that all records and procedures are in order, which results in data validity and security. Thus, the distributed ledger 122 can record data interactions between two parties (e.g., users 110) efficiently and in a verifiable and permanent way. By design, a blockchain 124 is resistant to modification of the data.

Any new interaction or activity within the blockchain network may trigger the building of a new block of the blockchain. An interaction may include a computing node 104 of the blockchain network transmitting or receiving data from another computing node 104 of the blockchain network or from a computing node that is not part of the blockchain network. Before a new block is added to the blockchain, it needs to be verified by a majority of the computing nodes in the blockchain network.

Each block 125 of the blockchain includes a hash of the block, a hash of the previous block, data that records one or more data interactions or activities associated with the block, and a timestamp of the one or more interactions or activities recorded by the block. The data stored in each block 125 depends on the type of blockchain 124. For example, the data included in a block 125 may include information relating to the data interaction recorded by the block 125 including transmitting/receiving data, details of the data files, a copy of data received or generated as part of the interaction, identities of the sending and receiving nodes involved in the interaction etc. A hash of a block is like a fingerprint that uniquely identifies the block (and the interaction or activity recorded by the block) within the blockchain. Each hash of a block is generated based on a cryptographic hash algorithm.

A user 106 authorized to access the blockchain network 120 and allowed to perform data interactions (e.g., with other users 106) within the blockchain network 120 and/or outside the blockchain network 120 may own and manage one or more data files 126. Each data file 126 of a user (e.g., user 106) may store a plurality of data objects 128. One or more data interactions may be performed within the blockchain network 120 in relation to a data file 126 of a user 106. For example, a data interaction may include transferring one or more data objects 128 from a data file 126 of a user 106 to another data file 126 of a different user 106 of the blockchain network 120 or outside the blockchain network 120. Another data interaction may include receiving one or more data objects 128 in the data file 126 of the user 106 from another data file 126 of a different user 106. Information relating to all data interactions that have taken place in the blockchain network 120 is stored in the blockchain 124 (e.g., in blocks 125 of the blockchain ledger 122).

In one or more embodiments, a data file 126 of a user 106 is a software application running on a computing node 104 owned and/or operated by the user 106. When a user 106 wants to receive data objects 128 from another user 106 of the blockchain network 120, user 106 may direct the other user 106 to a unique cryptographic address (e.g., public key) issued by the data file 126. As described above, information relating to all data interactions that have taken place in the blockchain network 120 is stored in the blockchain 124. In one embodiment, a data file 126 may not itself store the data objects 128 but may store information that points to a location of the data objects 128 within the blockchain 124. A data file 126 may be web-based or hardware-based. For example, a data file 126 may be stored in a mobile device or a desktop computer connected to the internet. Additionally or alternatively, a data file 126 may be stored in a device (e.g., USB drive) that is not connected to the internet.

One or more data interactions may be performed in the blockchain network 120 in accordance with smart contracts 133. A smart contract 130 is a software application or a piece of software code that implements conditions associated with one or more data interactions performed by users 106 of the blockchain network 120. A data interaction (e.g., transfer of data objects 128 between data files 126) is generally processed when the conditions in the smart contract 130 are met. Smart contracts 130 are generally stored in the blockchain 124 and can be freely accessed and reviewed by all users 106 of the blockchain. Once created and stored in the blockchain 124, a smart contract 130 generally cannot be modified. Data interactions performed in accordance with a smart contract 130 are generally processed by the blockchain (e.g., one or more computing nodes 104) without a third party. Smart contracts 130 make it possible to securely automate and decentralize any data interaction conducted in the blockchain network 120 no matter how complex. Thus, smart contracts 130 allow users 106 of the blockchain network 120 to securely engage in complex data interactions without a trusted third party needing to administer these data interactions.

At least a portion of the computing infrastructure 102 (e.g., one or more computing nodes 104) may implement a transfer manager 150 which may be configured to coordinate and/or manage data interactions conducted in the blockchain network 120. The transfer manager 150 comprises a processor 152, a memory 156, and a network interface 154. The transfer manager 150 may be configured as shown in FIG. 1 or in any other suitable configuration.

The processor 152 comprises one or more processors operably coupled to the memory 156. The processor 152 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 152 may be a programmable logic device, a microcontroller, a microprocessor, or any suitable combination of the preceding. The processor 152 is communicatively coupled to and in signal communication with the memory 156. The one or more processors are configured to process data and may be implemented in hardware or software. For example, the processor 152 may be 8-bit, 16-bit, 32-bit, 64-bit or of any other suitable architecture. The processor 152 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions (e.g., transfer manager instructions 162) to implement the transfer manager 150. In this way, processor 152 may be a special-purpose computer designed to implement the functions disclosed herein. In one or more embodiments, the transfer manager 150 is implemented using logic units, FPGAs, ASICs, DSPs, or any other suitable hardware. The transfer manager 150 is configured to operate as described with reference to FIGS. 2-5. For example, the processor 152 may be configured to perform at least a portion of the methods 400 and 500 as described in FIGS. 4 and 5 respectively.

The memory 156 comprises a non-transitory computer-readable medium such as one or more disks, tape drives, or solid-state drives, and may be used as an over-flow data storage device, to store programs when such programs are selected for execution, and to store instructions and data that are read during program execution. The memory 156 may be volatile or non-volatile and may comprise a read-only memory (ROM), random-access memory (RAM), ternary content-addressable memory (TCAM), dynamic random-access memory (DRAM), and static random-access memory (SRAM).

The memory 156 is operable to store the AI tool instructions 146, user data 164, copies of one or more smart contracts 130 and any other data needed to performed operations of the transfer manager 150 as described in embodiments of the present disclosure. The transfer manager instructions 162 may include any suitable set of instructions, logic, rules, or code operable to execute the transfer manager 150. User data may include, but is not limited to, information relating to the data files 126 and users 106 who own and/or manage the data files 126. For example, user data 164 may include, but is not limited to, one or more of a unique identify of each data file 126 stored in the blockchain network 120 (e.g., in the blockchain ledger 122), an amount of data objects 128 stored in each data file 126, or a unique identify of each user 106 that owns and/or maintains a data file 126.

The network interface 154 is configured to enable wired and/or wireless communications. The network interface 154 is configured to communicate data between the transfer manager 150 and other devices, systems, or domains (e.g., computing nodes 104). For example, the network interface 154 may comprise a Wi-Fi interface, a LAN interface, a WAN interface, a modem, a switch, or a router. The processor 152 is configured to send and receive data using the network interface 154. The network interface 154 may be configured to use any suitable type of communication protocol as would be appreciated by one of ordinary skill in the art.

It may be noted that each of the computing nodes 104 may be implemented like the transfer manager 150 shown in FIG. 1. For example, each of the computing nodes 104 may have a respective processor and a memory that stores data and instructions to perform a respective functionality of the computing node 104.

Delegating Data Transfers in the Blockchain Network

Figure 2:
FIG. 2 illustrates an example delegation to a second user of a data transfer from a first data file associated with a first user to an entity, in accordance with one or more embodiments of the present disclosure.
Figure 2:
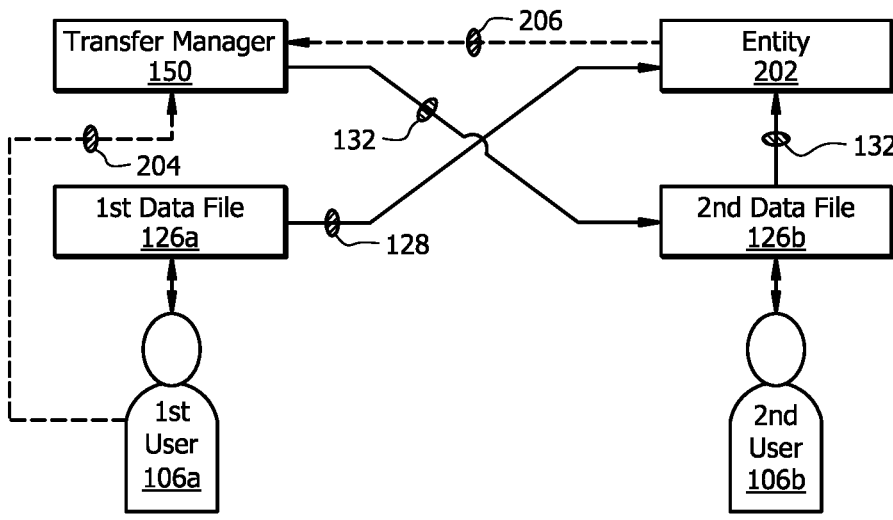

Transfer manager 150 may be configured to implement delegation of data transfers to be performed within the blockchain network 120. FIG. 2 illustrates an example delegation to a second user 106b of a data transfer from a first data file 126a associated with a first user 106a to an entity 202, in accordance with one or more embodiments of the present disclosure. For example, first user 106a may need to perform one or more transfers of data objects 128 from the first data file 126a of the first user 106a to the entity 202 (e.g., a data file of the entity 202). In one embodiment, the entity 202 may be another individual user 106 (not shown) or an organization that owns and/or manages a computing node 104 (not shown). In one embodiment, the computing node 104 owned and/or managed by the entity 202 may be part of the blockchain network 120. In an alternative embodiment, the computing node 104 owned and/or managed by the entity 202 may not be a part of the blockchain network 120. It may be noted the term "entity 202" in this disclosure may refer to the individual user 104/organization, to the computing node 104 owned and/or operated by the individual user 104/organization, or collectively to the individual user 104/organization and the computing node 104 owned and/or operated by the individual user 104/organization.

In some cases, a transfer of data objects 128 from the first data file 126a to the entity 202 may be a scheduled data transfer. For example, the first user 106a may have subscribed to a service provided by the entity 202 which may require the first user 106a to transfer a fixed or variable amount of data objects 128 to the entity periodically or according to according to a pre-determined schedule. In one embodiment, the particular amount of data objects 128 to be transferred at each instance of the pre-determined schedule may be indicated by the entity 202 to the first user 106a prior to the scheduled data transfer. In an additional or alternative embodiment, a transfers of data objects 128 from the first data file 126a to the entity 202 may be upon request by the entity 202 and based on an agreement between the first user 106a and the entity 202.

Transfer manager 150 may allow the first user 106a to delegate (e.g., allocate) to a second user 106b the performance of one or more data transfers (e.g., transfer of data objects 128) from the first data file 126a to the entity 202. Once the first user 106a has delegated a particular data transfer to the second user 106b, the second user 106b may perform the delegated data transfer from the first data file 126a on behalf of the first user 106a. For example, the second user 106b may perform on behalf of the first user 106a a delegated transfer of data objects 128 from the first data file 126a of the first user 106a to the entity 202.

To delegate (e.g., allocate) to the second user 106b a data transfer to be performed from the first data file 126a to the entity 202, the first user 106a may send (e.g., using a computing node 104) a request 204 to delegate (e.g., allocate) the data transfer to the second user 106b. The request 204 may include information relating to the delegation of the data transfer. For example, the request 204 may include, but is not limited to, one or more of a unique identity of the first user 106a, a unique identity of the first data file 126a of the first user 106a, a unique identity of the second user 106b, a unique identity of the second data file 126b of the second user 106b, a unique identity of the entity 202, or information associated with the data transfer to the entity 202. The information associated with the data transfer to the entity 202 may include, but is not limited to, one or more of a schedule associated with the data transfer (e.g., in case the data transfer is a recurring transfer), a due date by which the data transfer to the entity 202 is to be completed, or an amount of data objects 128 to be transmitted to the entity 202 from the first data file 126a. Additionally or alternatively, the request may include an amount of data objects 128 that are to be allocated to the second user 106b from the first data file 126a for one or more scheduled and/or unscheduled data transfers to the entity 202.

In response to receiving the request 204 from the first user 106a, the transfer manager 150 may be configured to generate a plurality of digital tokens 132, wherein each digital token represents at least one data object 128. As shown in FIG. 2, transfer manager 150 transmits the plurality of digital tokens 132 to the second data file 126b associated with the second user 106b. In one embodiment, an amount of the digital tokens 132 transmitted to the second data file 126b is equivalent (e.g., in value) to the amount of data objects 128 indicated in the request 204 for allocation to the second user 106b. In one embodiment, each digital token 132 represents (e.g., is equivalent to) a single data object 128. In this case, the transfer manager 150 generates and transmits to the second data file 126b a number of digital tokens 132 that is same as the number of data objects 128 indicated in the request 204 for delegation to the second user 106b.

As described in more detail below, once the digital tokens 132 are transferred to the second data file 126b, the transfer manager 150 allows the second user 106b to perform data transfers from the first data file 126a on behalf of the first user 106a using the digital tokens 132 allocated by the first user 106a. For example, to transfer a particular number of data objects 128 from the first data file 126a to the entity 202, the second user 106b may transfer to the entity 202 a particular number of the digital tokens 132 that are equivalent (e.g., in value) to the particular number of data objects 128. For example, when a scheduled data transfer requires the first user 106a to transfer a first amount (e.g., first number) of data objects 128 from the first data file 126a to the entity 202, the second user 106b may perform the scheduled data transfer on behalf of the first user 106a by transferring an equivalent amount (e.g., equivalent number) of digital tokens 132 from the second data file 126b to the entity 202.

In one embodiment, the second user 106b may receive information relating to a data transfer (e.g., scheduled data transfer) that is to be performed by the first user 106a from the entity 202 and/or from the first user 106a. For example, upon receiving the request 204 for delegation from the first user 106a and after transferring digital tokens to the second data file 126b, the transfer manager 150 may transmit an indication to the entity 202 of the delegation of one or more delegated data transfers to the second user 106b. This indication may include, but is not limited to, one or more of the one or more data transfers that are delegated to the second user 106b, the unique identity (e.g., network address) of the second user 106b, or other contact details (phone number, email address etc.) of the second user 106b. The entity 202 may use the contact details of the second user 106b to transmit to the second user 106b information associated with one or more data transfers (e.g., scheduled data transfers) that the entity 202 is to receive from the first user 106a. This information may include one or more of a type of the data transfer, an interaction identifier (ID) of the particular data transfer, an amount of data objects 128 to be received as part of each data transfer, and a due date by which each data transfer is to be received by the entity 202.

Upon receiving digital tokens 132 from the second user 106b relating to a delegated data transfer on behalf of the first user 106a, the entity 202 may transmit a request 206 to the transfer manager 150 for completion of the delegated data transfer that was performed by the second user 106b. The request 206 may include an indication that the second user 106b transferred a particular amount of digital tokens 132 to the entity 202 to fulfil the delegated data transfer. In one embodiment, the request 206 may additionally include the digital tokens 132 received by the entity 202 from the second data file 126b. Additionally or alternatively, the request 206 may include the interaction identifier of the data transfer.

Upon receiving the request 206 for completion of the delegated data transfer from the entity 202, the transfer manager 150 the transfer manager 150 transfers to the entity 202 a particular amount of data objects 128 from the first data file 126a that is equivalent to the particular amount of digital tokens 132 that were received by the entity 202 from the second data file 126b. This completes the data transfer.

In one or more embodiments, transfer manager 150 may be configured to control delegation of a data transfer and performance of a delegated data transfer based on one or more delegation rules 210. For example, the first user 106a may define one or more delegation rules 210 that control the delegation of data transfers and performance of delegated data transfers from the first data file 126*a*. The transfer manager 150 may be configured to generate a smart contract 130 that implements one or more pre-defined the delegation rules 210 relating to one or more delegated data transfers, for example, from the first data file 126*a*. For example, the transfer manager 150 may be configured to receive one or more delegation rules 210 from the first user 106*a*. The transfer manager 150 may be configured to generate a smart contract 130 to implement the one or more delegation rules 210 specified by the first user 106*a*. In one embodiment, the transfer manager 150 may be configured to store one or more delegation rules 210 received from the first user 106*a* in an existing (e.g., previously generated) smart contract 130 associated with the first data file 126*a*.

As shown in FIG. 2, a smart contract 130 may store and implement delegation rules 210 including, but not limited to, delegated transfers 211, one or more of authorizations 212 for delegation of the delegated transfers 211, transfer limits 214 associated with each delegated transfer 211, or approved transfers 216 for a particular user 106 (e.g., second user 106*b*).

The delegated transfers 211 includes a list of data transfers to be performed by the first user 106 that are delegated to other users 106 (e.g., second user 106*b*). Each delegated transfer 211 is associated with an authorization 212. An authorization 212 for delegation specifies who is authorized to perform a particular delegated transfer 211 on behalf of the first user 106*a*. For example, the smart contract 130 includes an authorization 212 relating to each delegated transfer 211 associated with the first user 106*a*, wherein an authorization 212 for a particular delegated transfer 211 includes information relating to the user (e.g., second user 106*b*) who is authorized to perform the delegated transfer 211 on behalf of the first user 106*a*. A transfer limit 214 may be defined for a particular delegated transfer 211 or a particular type of delegated transfers 211. A transfer limit 214 defined for a particular delegated transfer 211 or a particular type of delegated transfers 211 defines a maximum amount or number of data objects 128 a delegated user (e.g., second user 106*b*) is allowed to transfer from the first data file 126*a* for the respective particular delegated transfer 211 or the particular type of delegated transfers 211. A "type" of delegated transfers 211 is refers to a category of data transfers that the first user 106*a* is to perform to the entity 202, wherein the first user 106*a* may need to perform a plurality of data transfers associated with a particular type of data transfers. An example type of data transfers may include a plurality of periodic data transfers that the first user 106*a* needs to make to the entity 202 as part of a service subscription. Approved transfers 216 may define one or more types of data transfers a particular delegated user (e.g., second user 106*b*) is authorized to perform on behalf of the first user 106*a*.

The transfer manager 150 may be configured to invoke the smart contract 130 in response to receiving the request 206 from the entity 202 for completion of a delegated transfer 211 and check whether the requested delegated transfer 211 satisfies the delegation rules 210. The transfer manager 150 may be configured to transfer data objects 128 from the first data file 126*a* in response to the request 206 only upon determining that the requested delegated transfer 211 satisfies the delegation rules 210. For example, upon receiving the request 206 from the entity 202 for completion of a delegated transfer 211 performed by the second user 106*b* on behalf of the first user 106*a*, the transfer manager 150 invokes and runs the smart contract 130 to check and determine whether the requested delegated transfers 211 satisfies the delegation rules 210. For example, in one embodiment, the smart contract 130 checks the authorization 212 associated with the requested delegated transfer 211 and determines whether the second user 106*b* is authorized to perform the delegated transfer 211 on behalf of the first user 106*a*. In an additional or alternative embodiment, the transfer manager 150 checks the transfer limit 214 associated with the requested delegated transfer 211 and determines whether the amount of data objects 128 to be transferred from the first data file 126*a* as part of the delegated transfer 211 satisfies the transfer limit 214 defined for the delegated transfer 211. For example, the transfer manager 150 determines whether the amount or number of digital tokens 132 transferred by the second user 106*b* to the entity 202 as part of the delegated transfer 211 is equivalent to or lower (e.g., in value) than the maximum amount or number of data objects 128 the second user 106*b* is allowed to transfer from the first data file 126*a* for the particular delegated transfer 211. The transfer manager 150 determines that the delegated transfer 211 satisfies the transfer limit 214 when the amount or number of digital tokens 132 transferred by the second user 106*b* to the entity 202 as part of the delegated transfer 211 is equivalent to or lower (e.g., in value) than the maximum amount or number of data objects 128 the second user 106*b* is allowed to transfer from the first data file 126*a* for the particular delegated transfer 211.

In an additional or alternative embodiment, based on the request 206 received from the entity 202, the transfer manager 150 may be configured determine a type of the delegated data transfer 211 performed by the second user 106*b*. For example, the request 206 may include an indication of the type of delegated transfer 211. The transfer manager 150 may be configured to check the approved transfers 216 and determine whether the second user 106*b* is authorized to perform the determined type of the delegated transfer 211 from the first data file 126*a* on behalf of the first user 106*a*. The transfer manager 150 may be configured to determine that the requested delegated transfer 211 of the request 206 satisfies the delegation rules 210 in response to determining that the requested delegated transfer 211 satisfies all the delegated rules 210 as described above. It may be noted that transfer manager 150 may be configured to determine that the requested delegated transfer 211 of the request 206 satisfies the delegation rules 210 in response to determining that the requested delegated transfer 211 satisfies one or more of the delegated rules 210 as described above. The transfer manager 150 may be configured to transfer the requested amount of data objects 128 to the entity 202 in response to determining that the delegated transfer 211 of the request 206 satisfies the delegation rules 210.

Requesting and Receiving Data Transfers in a Blockchain Network

Figure 3:
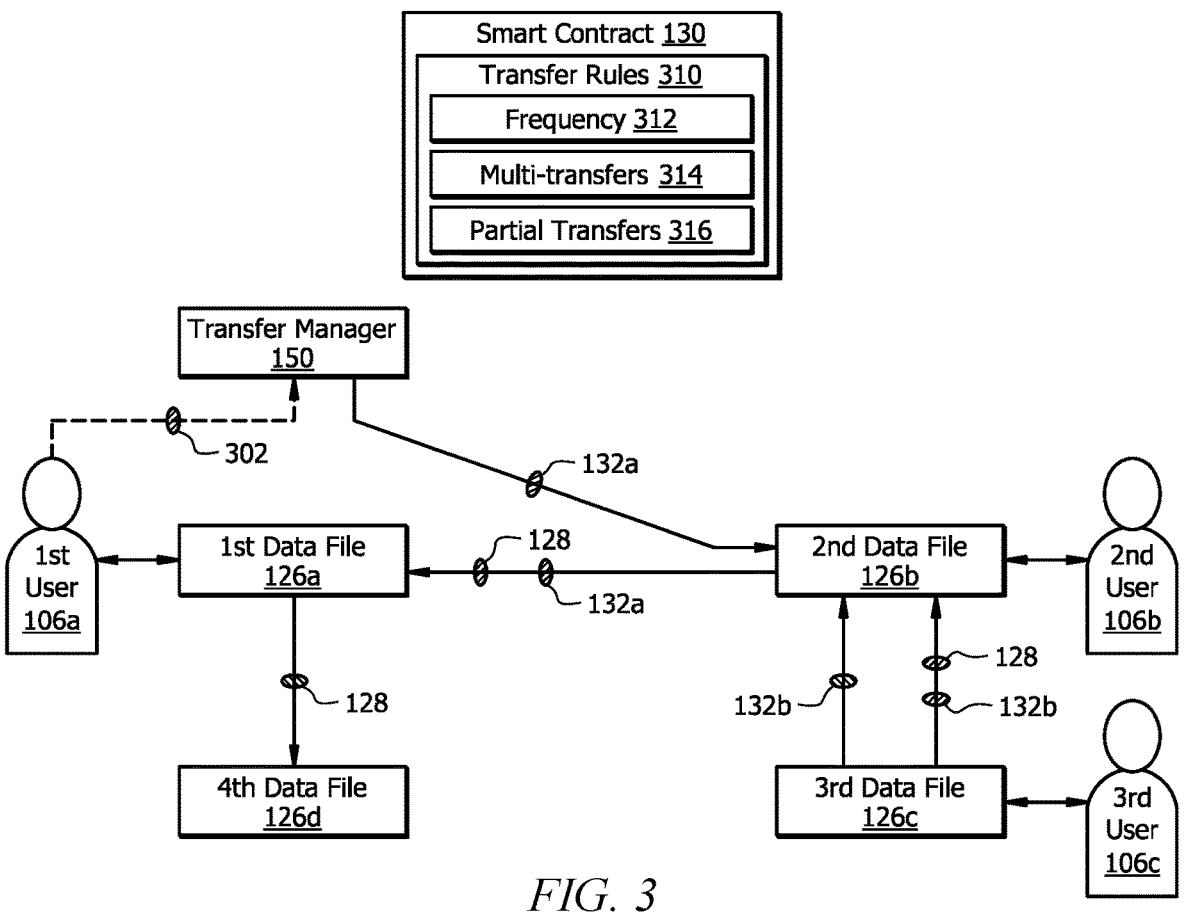
FIG. 3 illustrates an example requisition and reception of one or more data transfers from one or more users, in accordance with one or more embodiments of the present disclosure.

Transfer manager 150 may be configured to implement securely requesting and receiving data transfers within the blockchain network 120. FIG. 3 illustrates an example requisition and reception of one or more data transfers from one or more users 106, in accordance with one or more embodiments of the present disclosure. For example, first user 106*a* may need to receive a one or more data transfers (e.g., transfer of data objects 128) from one or more other users (e.g., a second user 106*b* and/or a third user 106*c*). A data transfer to be received by the first user 106*a* (e.g., at the first data file 126*a*) may be a one-off data transfer or may be part of a recurring data transfer. For example, the second user 106*b* may have subscribed to a service provided by the first user 106*a* requiring the second user 106*b* to transfer a fixed or variable amount of data objects 128 to the first user 106*a* periodically or according to a pre-determined schedule. In one embodiment, the particular amount of data objects 128 to be transferred to the first user 106*a* at each instance of the pre-determined schedule may be indicated by the first user 106*a* to the second user 106*b* prior to the scheduled data transfer. In an additional or alternative embodiment, a transfer of data objects 128 from the second data file 126*b* to the first data file 126*a* of the first user 106*a* may be upon request by the first user 106*a* and based on an agreement between the first user 106*a* and the second user 106*b*.

In one example use case, to request a data transfer from the second user 106*b*, the first user 106*a* (e.g., using a computing node 104) may transmit a request 302 for the data transfer to the transfer manager 150. The request 302 for the data transfer may include information relating to the requested data transfer including, but not limited to, one or more of a unique identity of the first user 106*a*, a unique identity of the first data file 126*a* of the first user 106*a* that is to receive the data transfer, a unique identity of the second user 106*b* from whom the data transfer is requested, a unique identity of the second data file 126*b* of the second user 106*b* from which the data transfer is to be received, or other information associated with the requested data transfer such as one or more of a schedule associated with the data transfer (e.g., in case the data transfer is a recurring transfer), a due date by which the data transfer to first data file 126*a* is to be completed, or an amount of data objects 128 to be transmitted to the first data file 126*a* from the second data file 126*b*.

In response to receiving the request 302 for the data transfer from the second user 106*b*, the transfer manager 150 may be configured to generate a plurality of digital tokens 132, wherein each digital token represents at least one data object 128. As shown in FIG. 2, transfer manager 150 transmits a plurality of digital tokens 132*a* to the second data file 126*b* associated with the second user 106*b*. In one embodiment, an amount of the digital tokens 132 transmitted to the second data file 126*b* is equivalent (e.g., in value) to the amount of data objects 128 indicated in the request 302 for reception from the second user 106*b*. In one embodiment, each digital token 132*a* represents (e.g., is equivalent to) a single data object 128. In this case, the transfer manager 150 generates and transmits to the second data file 126*b* a number of digital tokens 132*a* that is same as the number of data objects 128 indicated in the request 302 for reception from the second user 106*b*. Additionally or alternatively, the transfer manager 150 transmits to the second user 106*b* (e.g., along with the digital tokens or separately) information associated with the requested data, wherein the information includes, but is not limited to, the identity of the first user 106*a*, the identity of the first data file 126*a*, a reason of the requested transfer, an amount of data objects 128 to be transferred to the first data file 126*a* as part of the requested data transfer, and a due date by which the requested data transfer is to be completed. In one embodiment, each digital token 132*a* transmitted to the second data file 126*b* may include a unique identity (e.g., an interaction identifier) of the requested data transfer from the second data file 126*b*. This allows the transfer manager 150 to identify a particular digital token 132 of the digital tokens 132*a* as associated with the particular requested data transfer and to differentiate digital tokens 132*a* from other digital tokens 132 that may have been generated for requesting other data transfers from other users 106. The digital tokens 132*a* along with the information relating to the requested data transfers serves as a notification to the second user 106*b* of the pending data transfer that the second user 106*b* is to make to the first user 106*a*.

The second user 106*b* may perform the data transfer requested by the first user 106*a* by transmitting the requested amount or number of data objects 128 from the second data file 126*b* associated with the second user 106*b* to the first data file 126*a* associated with the first user 106*a*. In one embodiment, in conjunction with transferring data objects 128 to the first data file 126*a*, the second data file 126*b* transmits the digital tokens 132*a* back to the first data file 126*a*, wherein the reception of the digital tokens 132*a* back from the second data file 126*b* servers as a digital record of the completed data transfer of the requested amount of data objects 128 from the second user 106*b*. As described above, each digital token 132*a* that was transmitted to the second data file 126*b* includes a unique identity (e.g., an interaction identifier) of the requested data transfer from the second data file 126*b*. Thus, upon receiving the digital tokens 132*a* back from the second data file 126*b*, the transfer manager 150 identifies the digital tokens 132*a* as associated with the particular requested data transfer and marks the requested data transfer completed. In one embodiment, when the second user 106*b* initiates a transfer of data objects 128 associated with the requested data transfer to the first data file 126*a*, the transfer manager 150 automatically determines an amount or number of digital tokens 132*a* that is equivalent (e.g., in value) to the respective amount or number of data objects 128 being transferred to the first data file 126*a* and transmits the equivalent amount or number of the digital tokens 132*a* back to the first data file 126*a*. This allows the transfer manager 150 to determine whether the requested amount or number of data objects 128 was received partially or in full, based on the amount or number of digital tokens 132*a* received from the second data file 126*b*. Further this allows the second user 106*b* to perform multiple partial data transfers (along with transmitting the equivalent amounts of digital tokens 132*a*) that all amount to the requested amount of data objects 128.

In one or more embodiments, transfer manager 150 may be configured to setup and control reception of data objects 128 at a first data file 126*a* from one or more other data files (e.g., second user 106*b* and/or third user 106*c*) based on one or more transfer rules 310. Transfer manager 150 may generate and run one or more smart contracts 130 that are configured to implement and manage requested data transfers in the blockchain network 120 based on the transfer rules 310 defined for the data transfers. For example, the transfer manager 150 may be configured to receive one or more transfer rules 310 from the first user 106*a* or another user 106 (e.g., second user 106*b*). The transfer manager 150 may be configured to generate a smart contract 130 to implement the one or more transfer rules 310. In one embodiment, the transfer manager 150 may be configured to store one or more transfer rules 310 received from one or more users 106 in an existing (e.g., previously generated) smart contract 130 associated with the first data file 126*a*.

As shown in FIG. 3, smart contract 130 may store and implement transfer rules 310 including, but not limited to, a frequency 312 associated with a recurring data transfer, multi-transfer 314 defining data transfer from multiple users 106, or partial transfer 316 defining receiving partial transfers of data objects from one or more users 106.

In one embodiment, the first user 106*a* may want to schedule a recurring data transfer from the second data file 126*b* associated with the second user 106*b*. The recurring data transfers may be towards a subscribed service provided by the first user 106a that the second user 106b has subscribed to. For example, the request 302 for the data transfer requested by the first user 106a may include a request for a recurring data transfer. To request the recurring data transfer from the second data file 126b, the first user 106a include in the request 302 sent to the transfer manager 150 information associated with the recurring data transfer, wherein the information includes a frequency 312 (e.g., periodicity or transfer schedule) associated with the recurring data transfer and an amount of data objects 128 to be received from the second data file 126b at each instance of the defined frequency 312 of data transfer. In response to receiving the request for the recurring data transfer, the transfer manager 150 may generate a smart contract 130 that implements the recurring data transfer based on the information included in the request 302 received from the first user 106a. For example, based on the frequency 312 of the data transfers defined in the smart contract 130, at each instance of the defined frequency (e.g., prior to each data transfer is due), the transfer manager 150 automatically generates and transmits to the second data file 126b digital tokens 132a equivalent to the amount of data objects 128 to be received at the first data file 126a. In an additional or alternative embodiment, the smart contract 130 may trigger automatic data transfers from the second data file 126b to fulfil a requested transfer. For example, after transmitting digital tokens 132a to the second data file 126b, the transfer manager 150 determines whether the second data file 126b at least includes the requested amount of data objects 128 needed for the requested data transfer. In response to determining that the second data file 126b at least includes the requested amount of data objects 128 needed for the requested data transfer, the transfer manager 150 initiates the requested transfer of the data objects 128 and the digital tokens 132 back to the first data file 126a.

In an additional or alternative embodiment, the transfer manager 150 may setup a data transfer to the first data file 126a from multiple data files 126. For example, the first user 106a may want to receive a first data transfer of a first amount of data objects 128 from the second data file 126b associated with the second user 106b and receive a second data transfer of a second amount of data objects 128 (e.g., same as or different from the first amount of data objects 128) from a third data file 126c associated with a third user 106c. This type of data transfer from multiple users 106 may be referred to as a multi-transfer 314. To setup this multi-transfer 314, the first user 106a may include information associated with the multi transfer as part of the request 302 to the transfer manager 150, wherein the information relating to the multi-transfer 314 may include, but is not limited to, one or more of the identity of the second user 106b, the identity of the second data file 126b from which the first data transfer is to be received, an amount of data objects that are to be received from the second data file 126b as part of the first data transfer, a first due date by which the first data transfer is to be completed, the identity of the third user 106c, the identity of the third data file 126c from which the second data transfer is to be received, an amount of data objects that are to be received from the third data file 126c as part of the second data transfer, or a second due date by which the second data transfer is to be completed. The transfer manager 150 may be configured to generate a smart contract 130 to implement the requested multi-transfer 314 based on information received as part of the request 302 for the multi-transfer 314.

For example, prior to the first due date specified for the first data transfer, the transfer manager 150 generates and transmits to the second data file 126b a first amount of digital tokens 132 equivalent to the first amount of data objects 128 to be received at the first data file 126a from the second data file 126b. Similarly, prior to the second due date specified for the second data transfer, the transfer manager 150 generates and transmits to the third data file 126c a second amount of digital tokens 132 equivalent to the second amount of data objects 128 to be received at the first data file 126a from the third data file 126c. Additionally, the transfer manager 150 may transmit to the second user 106b and the third user 106c information associated with the respective first data transfer and the second data transfers. This information includes, but is not limited to, the identity of the first user 106a, the identity of the first data file 126a, a reason of the requested transfer (e.g., first or second data transfer), an amount of data objects 128 to be transferred to the first data file 126a as part of the requested data transfer (e.g., first amount of data objects or second amount of data objects), and a due date by which the requested data transfer is to be completed (e.g., the first due date or the second due date).

In an additional or alternative embodiment, the smart contract 130 may trigger automatic data transfers from the second data file 126b and the third data file 126c to fulfil the requested first data transfer and the second data transfer respectively. For example, after transmitting the first amount of digital tokens 132 to the second data file 126b, the transfer manager 150 determines whether the second data file 126b at least includes the requested first amount of data objects 128 needed for the requested first data transfer. In response to determining that the second data file 126b at least includes the requested first amount of data objects 128 needed for the requested first data transfer, the transfer manager 150 initiates the requested transfer of the first amount of data objects 128 and the first amount of digital tokens 132 back to the first data file 126a. Similarly, after transmitting the second amount of digital tokens 132 to the third data file 126c, the transfer manager 150 determines whether the third data file 126c at least includes the requested second amount of data objects 128 needed for the requested second data transfer. In response to determining that the third data file 126c at least includes the requested second amount of data objects 128 needed for the requested second data transfer, the transfer manager 150 initiates the requested transfer of the second amount of data objects 128 and the second amount of digital tokens 132 back to the first data file 126a.

In one or more embodiments, the transfer manager 150 may be configured to automatically transfer a pre-determined amount of data objects 128 to a fourth data file 126d in response to receiving one or more requested data transfers from respective one or more users 106. For example, following the example use case discussed in the previous paragraph, the first user 106a may define a transfer rule 310 that specifies that a third amount of data objects 128 is to be transferred to the fourth data file 126d in response to determining that the first data transfer and the second data transfers have been completed. In one embodiment, the third amount of data objects 128 may include (e.g., equal or exceed) the first and second amounts of data objects put together.

In some cases, the transfer manager 150 may be configured to setup and implement partial data transfers from one or more data files 126. For example, in response to receiving the digital tokens 132a and the information associated with the requested data transfer from the first user 106a, the second user 106b may define a partial transfer 316 that specifies that a portion of the requested data objects is to be received by the second data file 126b from the third data file 126c associated with the third user 106c. The transfer manager 150 may generate a smart contract 130 to implement the partial transfer 316 defined by the second user 106b. To implement the partial transfer 316, upon receiving the digital tokens 132a and the information associated with the requested data transfer from the first user 106a, the transfer manager 150 may invoke and run the smart contract 130 to automatically transfer to the third data file 126c a portion of the digital tokens 132a (shown as digital tokens 132b) equivalent to the portion of requested data objects 128 to be received from the third data file 126c. In conjunction with transmitting digital tokens 132b, the transfer manager 150 transmits information associated with the requested partial data transfer from the third data file 126c. This information includes, but is not limited to, one or more of an identity of the second user 106b requesting the partial transfer, the identity of the second data file 126b that is to receive the partial data transfer, a reason for the requested partial data transfer, an amount of the data objects requested for the partial data transfer, or a due date by which the partial data transfer is to be completed.

In an additional or alternative embodiment, the smart contract 130 may trigger an automatic data transfer from the third data file 126c to fulfil a requested partial transfer 316 of data objects 128. For example, after transmitting digital tokens 132b to the third data file 126c, the transfer manager 150 determines whether the third data file 126c at least includes the requested amount of data objects 128 needed for the requested partial data transfer. In response to determining that the third data file 126c at least includes the requested amount of data objects 128 needed for the requested partial data transfer, the transfer manager 150 initiates the requested transfer of the data objects 128 and the digital tokens 132b back to the second data file 126b.

Once the partial data transfer has been completed, the transfer manager 150 determines whether the second data file 126b at least includes a remaining portion of the data objects 128 needed to fulfil the data transfer requested by the first user 106a. In response to determining that the second data file 126b at least includes remaining portion of the data objects 128 needed to fulfil the data transfer requested by the first user 106a, the transfer manager 150 initiates the requested transfer of the data objects 128 and the digital tokens 132a back to the first data file 126a.

FIG. 4 illustrates a flowchart of an example method 400 for delegating a data transfer, in accordance with one or more embodiments of the present disclosure. Method 400 may be performed by the transfer manager 150 shown in FIG. 1.

At operation 402, the transfer manager 150 receives a first request (e.g., request 204) to delegate, to a second user 106b, one or more scheduled transfers of data objects 128 from a first data file 126a to a first entity (e.g., entity 202), wherein the first request comprises a first amount of data objects 128 to be allocated to the second user 106b from the first data file 126a for the scheduled transfers.

As described above, transfer manager 150 may allow the first user 106a to delegate (e.g., allocate) to a second user 106b the performance of one or more data transfers (e.g., transfer of data objects 128) from the first data file 126a to the entity 202. Once the first user 106a has delegated a particular data transfer to the second user 106b, the second user 106b may perform the delegated data transfer from the first data file 126a on behalf of the first user 106a. For example, the second user 106b may perform on behalf of the first user 106a a delegated transfer of data objects 128 from the first data file 126a of the first user 106a to the entity 202.

To delegate (e.g., allocate) to the second user 106b a data transfer to be performed from the first data file 126a to the entity 202, the first user 106a may send (e.g., using a computing node 104) a request 204 to delegate (e.g., allocate) the data transfer to the second user 106b. The request 204 may include information relating to the delegation of the data transfer. For example, the request 204 may include, but is not limited to, one or more of a unique identity of the first user 106a, a unique identity of the first data file 126a of the first user 106a, a unique identity of the second user 106b, a unique identity of the second data file 126b of the second user 106b, a unique identity of the entity 202, or information associated with the data transfer to the entity 202. The information associated with the data transfer to the entity 202 may include, but is not limited to, one or more of a schedule associated with the data transfer (e.g., in case the data transfer is a recurring transfer), a due date by which the data transfer to the entity 202 is to be completed, or an amount of data objects 128 to be transmitted to the entity 202 from the first data file 126a. Additionally or alternatively, the request may include an amount of data objects 128 that are to be allocated to the second user 106b from the first data file 126a for one or more scheduled and/or unscheduled data transfers to the entity 202.

At operation 404, the transfer manager 150 generates a plurality of digital tokens 132. At operation 406, the transfer manager 150 transmits the plurality of the digital tokens 132 to the second data file 126b associated with the second user 106b.

As described above, in response to receiving the request 204 from the first user 106a, the transfer manager 150 may be configured to generate a plurality of digital tokens 132, wherein each digital token represents at least one data object 128. As shown in FIG. 2, transfer manager 150 transmits the plurality of digital tokens 132 to the second data file 126b associated with the second user 106b. In one embodiment, an amount of the digital tokens 132 transmitted to the second data file 126b is equivalent (e.g., in value) to the amount of data objects 128 indicated in the request 204 for allocation to the second user 106b. In one embodiment, each digital token 132 represents (e.g., is equivalent to) a single data object 128. In this case, the transfer manager 150 generates and transmits to the second data file 126b a number of digital tokens 132 that is same as the number of data objects 128 indicated in the request 204 for delegation to the second user 106b.

At operation 408, the transfer manager 150 receives a second request (e.g., request 206) from the first entity (e.g., entity 202) for a first scheduled transfer of the data objects 128 from the first data file 126a, wherein the second request comprises an indication that a second amount of the digital tokens 132 were transferred to the first entity by the second user 106b from the second data file 126b for the first scheduled transfer.

As described above, once the digital tokens 132 are transferred to the second data file 126b, the transfer manager 150 allows the second user 106b to perform data transfers from the first data file 126a on behalf of the first user 106a using the digital tokens 132 allocated by the first user 106a. For example, to transfer a particular number of data objects 128 from the first data file 126a to the entity 202, the second user 106b may transfer to the entity 202 a particular number of the digital tokens 132 that are equivalent (e.g., in value) to the particular number of data objects 128. For example, when a scheduled data transfer requires the first user 106a to transfer a first amount (e.g., first number) of data objects 128 from the first data file 126a to the entity 202, the second user 106*b* may perform the scheduled data transfer on behalf of the first user 106*a* by transferring an equivalent amount (e.g., equivalent number) of digital tokens 132 from the second data file 126*b* to the entity 202.

In one embodiment, the second user 106*b* may receive information relating to a data transfer (e.g., scheduled data transfer) that is to be performed by the first user 106*a* from the entity 202 and/or from the first user 106*a*. For example, upon receiving the request 204 for delegation from the first user 106*a* and after transferring digital tokens to the second data file 126*b*, the transfer manager 150 may transmit an indication to the entity 202 of the delegation of one or more delegated data transfers to the second user 106*b*. This indication may include, but is not limited to, one or more of the one or more data transfers that are delegated to the second user 106*b*, the unique identity (e.g., network address) of the second user 106*b*, or other contact details (phone number, email address etc.) of the second user 106*b*. The entity 202 may use the contact details of the second user 106*b* to transmit to the second user 106*b* information associated with one or more data transfers (e.g., scheduled data transfers) that the entity 202 is to receive from the first user 106*a*. This information may include one or more of a type of the data transfer, an interaction identifier (ID) of particular data transfer, an amount of data objects 128 to be received as part of each data transfer, and a due date by which each data transfer is to be received by the entity 202.

Upon receiving digital tokens 132 from the second user 106*b* relating to a delegated data transfer on behalf of the first user 106*a*, the entity 202 may transmit a request 206 to the transfer manager 150 for completion of the delegated data transfer that was performed by the second user 106*b*. The request 206 may include an indication that the second user 106*b* transferred a particular amount of digital tokens 132 to the entity 202 to fulfil the delegated data transfer. In one embodiment, the request 206 may additionally include the digital tokens 132 received by the entity 202 from the second data file 126*b*. Additionally or alternatively, the request 206 may include the interaction identifier of the data transfer.

At operation 410, in response to receiving the second request (e.g., request 206), the transfer manager 150 transfers to the first entity (e.g., entity 202) a third amount of the data objects 128 from the first data file 126*a* that is equivalent to the second amount of the digital tokens 132 that were transferred to the first entity by the second user 106*b* from the second data file 126*b* for the requested first scheduled transfer.

As described above, upon receiving the request 206 for completion of the delegated data transfer from the entity 202, the transfer manager 150 transfers to the entity 202 a particular amount of data objects 128 from the first data file 126*a* that is equivalent to the particular amount of digital tokens 132 that were received by the entity 202 from the second data file 126*b*. This completes the data transfer.

FIG. 5 illustrates a flowchart of an example method 500 for requesting and receiving a data transfer, in accordance with one or more embodiments of the present disclosure. Method 500 may be performed by the transfer manager 150 shown in FIG. 1.

At operation 502, the transfer manager 150 receives a request 302 to receive a transfer of a first amount of data objects 128 into a first data file 126*a* associated with a first user 106*a* from a second data file 126*b* associated with a second user 106*b*.

As described above, transfer manager 150 may be configured to implement securely requesting and receiving data transfers within the blockchain network 120. Referring to FIG. 3, first user 106*a* may need to receive a one or more data transfers (e.g., transfer of data objects 128) from one or more other users (e.g., a second user 106*b* and/or a third user 106*c*). A data transfer to be received by the first user 106*a* (e.g., at the first data file 126*a*) may be a one-off data transfer or may be part of a recurring data transfer. For example, the second user 106*b* may have subscribed to a service provided by the first user 106*a* requiring the second user 106*b* to transfer a fixed or variable amount of data objects 128 to the first user 106*a* periodically or according to a pre-determined schedule. In one embodiment, the particular amount of data objects 128 to be transferred to the first user 106*a* at each instance of the pre-determined schedule may be indicated by the first user 106*a* to the second user 106*b* prior to the scheduled data transfer. In an additional or alternative embodiment, a transfer of data objects 128 from the second data file 126*b* to the first data file 126*a* of the first user 106*a* may be upon request by the first user 106*a* and based on an agreement between the first user 106*a* and the second user 106*b*.

In one example use case, to request a data transfer from the second user 106*b*, the first user 106*a* (e.g., using a computing node 104) may transmit a request 302 for the data transfer to the transfer manager 150. The request 302 for the data transfer may include information relating to the requested data transfer including, but not limited to, one or more of a unique identity of the first user 106*a*, a unique identity of the first data file 126*a* of the first user 106*a* that is to receive the data transfer, a unique identity of the second user 106*b* from whom the data transfer is requested, a unique identity of the second data file 126*b* of the second user 106*b* from which the data transfer is to be received, or other information associated with the requested data transfer such as one or more of a schedule associated with the data transfer (e.g., in case the data transfer is a recurring transfer), a due date by which the data transfer to first data file 126*a* is to be completed, or an amount of data objects 128 to be transmitted to the first data file 126*a* from the second data file 126*b*.

At operation 504, the transfer manager 150 generates a first plurality of digital tokens 132*a*.

At operation 506, the transfer manager 150 transmits the first plurality of digital tokens 132*a* to the second data file 126*b* associated with the second user 106*b*.

As described above, in response to receiving the request 302 for the data transfer from the second user 106*b*, the transfer manager 150 may be configured to generate a plurality of digital tokens 132, wherein each digital token represents at least one data object 128. As shown in FIG. 2, transfer manager 150 transmits a plurality of digital tokens 132*a* to the second data file 126*b* associated with the second user 106*b*. In one embodiment, an amount of the digital tokens 132 transmitted to the second data file 126*b* is equivalent (e.g., in value) to the amount of data objects 128 indicated in the request 302 for reception from the second user 106*b*. In one embodiment, each digital token 132*a* represents (e.g., is equivalent to) a single data object 128. In this case, the transfer manager 150 generates and transmits to the second data file 126*b* a number of digital tokens 132*a* that is same as the number of data objects 128 indicated in the request 302 for reception from the second user 106*b*.

At operation 508, the transfer manager 150 transmits to the second data file 126*b* information associated with the first plurality of digital tokens 132*a*, wherein the information at least comprises an identity of the first user 106*a*, an identity of the first data file 126a, a reason of the requested transfer, and a due date when the requested transfer is due.

As described above, the transfer manager 150 transmits to the second user 106b (e.g., in conjunction with transmitting the digital tokens 132a or separately) information associated with the requested data, wherein the information includes, but is not limited to, the identity of the first user 106a, the identity of the first data file 126a, a reason of the requested transfer, an amount of data objects 128 to be transferred to the first data file 126a as part of the requested data transfer, and a due date by which the requested data transfer is to be completed. In one embodiment, each digital token 132a transmitted to the second data file 126b may include a unique identity (e.g., an interaction identifier) of the requested data transfer from the second data file 126b. This allows the transfer manager 150 to identify a particular digital token 132 of the digital tokens 132a as associated with the particular requested data transfer and to differentiate digital tokens 132a from other digital tokens 132 that may have been generated for requesting other data transfers from other users 106. The digital tokens 132a along with the information relating to the requested data transfers serves as a notification to the second user 106b of the pending data transfer that the second user 106b is to make to the first user 106a.

At operation 510, the transfer manager 150 receives the first plurality of digital tokens 132a and the first amount of data objects 128 at the first data file 126a from the second data file 126b, wherein the first plurality of digital tokens 132a received from the second data file 126b is a digital record of the transfer of the first amount of data objects 128 at the first data file 126a.

As described above, The second user 106b may perform the data transfer requested by the first user 106a by transmitting the requested amount or number of data objects 128 from the second data file 126b associated with the second user 106b to the first data file 126a associated with the first user 106a. In one embodiment, in conjunction with transferring data objects 128 to the first data file 126a, the second data file 126b transmits the digital tokens 132a back to the first data file 126a, wherein the reception of the digital tokens 132a back from the second data file 126b servers as a digital record of the completed data transfer of the requested amount of data objects 128 from the second user 106b. As described above, each digital token 132a that was transmitted to the second data file 126b includes a unique identity (e.g., an interaction identifier) of the requested data transfer from the second data file 126b. Thus, upon receiving the digital tokens 132a back from the second data file 126b, the transfer manager 150 identifies the digital tokens 132a as associated with the particular requested data transfer and marks the requested data transfer completed. In one embodiment, when the second user 106b initiates a transfer of data objects 128 associated with the requested data transfer to the first data file 126a, the transfer manager 150 automatically determines an amount or number of digital tokens 132a that is equivalent (e.g., in value) to the respective amount or number of data objects 128 being transferred to the first data file 126a and transmits the equivalent amount or number of the digital tokens 132a back to the first data file 126a. This allows the transfer manager 150 to determine whether the requested amount or number of data objects 128 was received partially or in full, based on the amount or number of digital tokens 132a received from the second data file 126b.

At operation 511, in response to receiving the first plurality of digital tokens at the first data file from the second data file, the transfer manager 150 determines that the requested data transfer has been completed.

In an example banking use case, the blockchain network 120 may implement a digital currency network. The data files 126 (e.g., first data file 126a and second data file 126b) may correspond to digital wallets and data objects 128 stored in the data files 126 may correspond to digital currency.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a blockchain network storing, in a memory, a first data file associated with a first user and a second data file associated with a second user; and
a processor communicatively coupled to the blockchain network and configured to:
receive a request to receive a transfer of a first amount of data objects into the first data file associated with the first user from the second data file associated with the second user;
generate a first plurality of digital tokens, wherein:
each digital token represents at least one data object; and
the first plurality of digital tokens amounts to the first amount of data objects to be received from the second data file;
transmit the first plurality of digital tokens to the second data file associated with the second user;
transmit to the second data file information associated with the first plurality of digital tokens, wherein the information at least comprises an identity of the first user, an identity of the first data file, a reason of the requested transfer, and a due date when the requested transfer is due;
receive the first plurality of digital tokens and the first amount of data objects at the first data file from the second data file, wherein the first plurality of digital tokens received from the second data file is a digital record of the transfer of the first amount of data objects at the first data file; and in response to receiving the first plurality of digital tokens at the first data file from the second data file, determine that the requested data transfer has been completed.

2. The system of claim 1, wherein the processor is further configured to:

receive a plurality of transfer rules associated with the requested transfer of the first amount of data objects into the first data file from the second data file; and store the plurality of transfer rules in a first smart contract associated with the first data file.

3. The system of claim 2, wherein:

the plurality of transfer rules at least comprises a first transfer rule defining a frequency associated with the requested transfer;

the processor is further configured to:

access the first smart contract;

detect the first transfer rule from the first smart contract;

at each instance of the frequency:

generate the first plurality of digital tokens;

transmit the first plurality of digital tokens to the second data file;

determine whether the second data file at least comprises the first amount of the data objects; and in response to determining that the second data file at least comprises the first amount of data objects, initiate the requested transfer of the first plurality of digital tokens and the first amount of data objects from the second data file to the first data file.

4. The system of claim 2, wherein:

the plurality of transfer rules comprises a first transfer rule that defines receiving, at the first data file, the first amount of data objects from the second data file associated with the second user and receiving a second amount of data objects from a third data file associated with a third user;

the processor is further configured to:

access the first smart contract;

detect the first transfer rule from the first smart contract;

in response to detecting the first transfer rule:

generate the first plurality of digital tokens;

generate a second plurality of digital tokens, wherein the second plurality of digital tokens amounts to the second amount of data objects to be received from the third data file associated with the third user;

transmit the first plurality of digital tokens to the second data file associated with the second user;

transmit the second plurality of digital tokens to the third data file associated with the third user;

transmit to the second data file the information associated with the first plurality of digital tokens; and transmit to the third data file second information associated with the second plurality of digital tokens, wherein the second information at least comprises an identity of the first user, an identity of the first data file, a reason of the requested transfer, and a due date when the requested transfer is due;

receive the first plurality of digital tokens and the first amount of data objects at the first data file from the second data file;

receive the second plurality of digital tokens and the second amount of data objects at the first data file from the third data file, wherein the second plurality of digital tokens received from the third data file is a digital record of the transfer of the second amount of data objects at the first data file; and in response to receiving the first plurality of digital tokens and the second plurality of digital tokens at the first data file from the second data file and the third data file respectively, determine that the requested data transfer has been completed.

5. The system of claim 4, wherein the processor is further configured to:

in response to receiving the first plurality of digital tokens and the second plurality of digital tokens at the first data file from the second data file and the third data file respectively, transfer a third amount of data objects to a fourth data file, wherein the third amount includes the first amount and the second amount.

6. The system of claim 2, wherein:

the plurality of transfer rules comprises a first transfer rule specifying that a first portion of the first amount of data objects is to be received at the second data file from a third data file associated with a third user;

the processor is further configured to:

access the first smart contract;

detect the first transfer rule from the first smart contract;

in response to detecting the first transfer rule:

transmit a first portion of the first plurality of digital tokens to the third data file associated with the third user;

transmit to the third data file second information associated with the first portion of the first plurality of digital tokens, wherein the second information at least comprises an identity of the second user, an identity of the second data file, a reason of the requested transfer of the first portion data objects from the third data file, and a due date when the requested transfer is due;

receive the first portion of the digital tokens and the first portion of data objects at the second data file from the third data file, wherein the first portion of the digital tokens received from the third data file is a digital record of the transfer of the first portion of the data objects at the second data file; and in response to receiving the first portion of the digital tokens and the first portion of data objects at the second data file from the third data file, determine that the requested transfer of the first portion of the data objects has been completed.

7. The system of claim 6, wherein the processor is further configured to:

after receiving the first portion of the first amount of data objects at the second data file from the third data file:

determine whether the second data file at least comprises a remaining portion of the first amount of data objects; and in response to determining that the second data file at least comprises the remaining portion of the first amount of data objects, initiate the requested transfer of the first plurality of digital tokens and the first amount of data objects from the second data file to the first data file.

8. A method for requesting data transfers, comprising:

receiving a request to receive a transfer of a first amount of data objects into a first data file associated with a first user from a second data file associated with a second user, wherein the first data file and the second data file are stored in a memory associated with a blockchain network;

generating a first plurality of digital tokens, wherein:

each digital token represents at least one data object; and the first plurality of digital tokens amounts to the first amount of data objects to be received from the second data file;

transmitting the first plurality of digital tokens to the second data file associated with the second user;

transmitting to the second data file information associated with the first plurality of digital tokens, wherein the information at least comprises an identity of the first user, an identity of the first data file, a reason of the requested transfer, and a due date when the requested transfer is due;

receiving the first plurality of digital tokens and the first amount of data objects at the first data file from the second data file, wherein the first plurality of digital tokens received from the second data file is a digital record of the transfer of the first amount of data objects at the first data file; and in response to receiving the first plurality of digital tokens at the first data file from the second data file, determining that the requested data transfer has been completed.

9. The method of claim 8, further comprising:

receiving a plurality of transfer rules associated with the requested transfer of the first amount of data objects into the first data file from the second data file; and storing the plurality of transfer rules in a first smart contract associated with the first data file.

10. The method of claim 9, wherein:

the plurality of transfer rules at least comprises a first transfer rule defining a frequency associated with the requested transfer;

further comprising:

accessing the first smart contract;

detecting the first transfer rule from the first smart contract;

at each instance of the frequency:

generating the first plurality of digital tokens;

transmitting the first plurality of digital tokens to the second data file;

determining whether the second data file at least comprises the first amount of the data objects; and in response to determining that the second data file at least comprises the first amount of data objects, initiating the requested transfer of the first plurality of digital tokens and the first amount of data objects from the second data file to the first data file.

11. The method of claim 9, wherein:

the plurality of transfer rules comprises a first transfer rule that defines receiving, at the first data file, the first amount of data objects from the second data file associated with the second user and receiving a second amount of data objects from a third data file associated with a third user;

further comprising:

accessing the first smart contract;

detecting the first transfer rule from the first smart contract;

in response to detecting the first transfer rule:

generating the first plurality of digital tokens;

generating a second plurality of digital tokens, wherein the second plurality of digital tokens amounts to the second amount of data objects to be received from the third data file associated with the third user;

transmitting the first plurality of digital tokens to the second data file associated with the second user;

transmitting the second plurality of digital tokens to the third data file associated with the third user;

transmitting to the second data file the information associated with the first plurality of digital tokens; and transmitting to the third data file second information associated with the second plurality of digital tokens, wherein the second information at least comprises an identity of the first user, an identity of the first data file, a reason of the requested transfer, and a due date when the requested transfer is due;

receiving the first plurality of digital tokens and the first amount of data objects at the first data file from the second data file;

receiving the second plurality of digital tokens and the second amount of data objects at the first data file from the third data file, wherein the second plurality of digital tokens received from the third data file is a digital record of the transfer of the second amount of data objects at the first data file; and in response to receiving the first plurality of digital tokens and the second plurality of digital tokens at the first data file from the second data file and the third data file respectively, determining that the requested data transfer has been completed.

12. The method of claim 11, further comprising:

in response to receiving the first plurality of digital tokens and the second plurality of digital tokens at the first data file from the second data file and the third data file respectively, transferring a third amount of data objects to a fourth data file, wherein the third amount includes the first amount and the second amount.

13. The method of claim 9, wherein:

the plurality of transfer rules comprises a first transfer rule specifying that a first portion of the first amount of data objects is to be received at the second data file from a third data file associated with a third user;

further comprising:

accessing the first smart contract;

detecting the first transfer rule from the first smart contract;

in response to detecting the first transfer rule:

transmitting a first portion of the first plurality of digital tokens to the third data file associated with the third user;

transmitting to the third data file second information associated with the first portion of the first plurality of digital tokens, wherein the second information at least comprises an identity of the second user, an identity of the second data file, a reason of the requested transfer of the first portion data objects from the third data file, and a due date when the requested transfer is due;

receiving the first portion of the digital tokens and the first portion of data objects at the second data file from the third data file, wherein the first portion of the digital tokens received from the third data file is a digital record of the transfer of the first portion of the data objects at the second data file; and in response to receiving the first portion of the digital tokens and the first portion of data objects at the second data file from the third data file, determining that the requested transfer of the first portion of the data objects has been completed.

14. The method of claim 13, further comprising:

after receiving the first portion of the first amount of data objects at the second data file from the third data file:

determining whether the second data file at least comprises a remaining portion of the first amount of data objects; and in response to determining that the second data file at least comprises the remaining portion of the first amount of data objects, initiating the requested transfer of the first plurality of digital tokens and the first amount of data objects from the second data file to the first data file.

15. A non-transitory computer-readable medium storing instructions that when executed by a processor causes the processor to:

receive a request to receive a transfer of a first amount of data objects into a first data file associated with a first user from a second data file associated with a second user, wherein the first data file and the second data file are stored in a memory associated with a blockchain network;

generate a first plurality of digital tokens, wherein:

each digital token represents at least one data object; and the first plurality of digital tokens amounts to the first amount of data objects to be received from the second data file;

transmit the first plurality of digital tokens to the second data file associated with the second user;

transmit to the second data file information associated with the first plurality of digital tokens, wherein the information at least comprises an identity of the first user, an identity of the first data file, a reason of the requested transfer, and a due date when the requested transfer is due;

receive the first plurality of digital tokens and the first amount of data objects at the first data file from the second data file, wherein the first plurality of digital tokens received from the second data file is a digital record of the transfer of the first amount of data objects at the first data file; and in response to receiving the first plurality of digital tokens at the first data file from the second data file, determine that the requested data transfer has been completed.

16. The non-transitory computer-readable medium of claim 15, wherein the instructions further cause the processor to:

receive a plurality of transfer rules associated with the requested transfer of the first amount of data objects into the first data file from the second data file; and store the plurality of transfer rules in a first smart contract associated with the first data file.

17. The non-transitory computer-readable medium of claim 16, wherein:

the plurality of transfer rules at least comprises a first transfer rule defining a frequency associated with the requested transfer;

wherein the instructions further cause the processor to:

access the first smart contract;

detect the first transfer rule from the first smart contract;

at each instance of the frequency:

generate the first plurality of digital tokens;

transmit the first plurality of digital tokens to the second data file;

determine whether the second data file at least comprises the first amount of the data objects; and in response to determining that the second data file at least comprises the first amount of data objects, initiate the requested transfer of the first plurality of digital tokens and the first amount of data objects from the second data file to the first data file.

18. The non-transitory computer-readable medium of claim 16, wherein:

the plurality of transfer rules comprises a first transfer rule that defines receiving, at the first data file, the first amount of data objects from the second data file associated with the second user and receiving a second amount of data objects from a third data file associated with a third user;

wherein the instructions further cause the processor to:

access the first smart contract;

detect the first transfer rule from the first smart contract;

in response to detecting the first transfer rule:

generate the first plurality of digital tokens;

generate a second plurality of digital tokens, wherein the second plurality of digital tokens amounts to the second amount of data objects to be received from the third data file associated with the third user;

transmit the first plurality of digital tokens to the second data file associated with the second user;

transmit the second plurality of digital tokens to the third data file associated with the third user;

transmit to the second data file the information associated with the first plurality of digital tokens; and transmit to the third data file second information associated with the second plurality of digital tokens, wherein the second information at least comprises an identity of the first user, an identity of the first data file, a reason of the requested transfer, and a due date when the requested transfer is due;

receive the first plurality of digital tokens and the first amount of data objects at the first data file from the second data file;

receive the second plurality of digital tokens and the second amount of data objects at the first data file from the third data file, wherein the second plurality of digital tokens received from the third data file is a digital record of the transfer of the second amount of data objects at the first data file; and in response to receiving the first plurality of digital tokens and the second plurality of digital tokens at the first data file from the second data file and the third data file respectively, determine that the requested data transfer has been completed.

19. The non-transitory computer-readable medium of claim 18, wherein the instructions further cause the processor to:

in response to receiving the first plurality of digital tokens and the second plurality of digital tokens at the first data file from the second data file and the third data file respectively, transfer a third amount of data objects to a fourth data file, wherein the third amount includes the first amount and the second amount.

20. The non-transitory computer-readable medium of claim 16, wherein:

the plurality of transfer rules comprises a first transfer rule specifying that a first portion of the first amount of data objects is to be received at the second data file from a third data file associated with a third user;

wherein the instructions further cause the processor to:

access the first smart contract;

detect the first transfer rule from the first smart contract;

in response to detecting the first transfer rule:

transmit a first portion of the first plurality of digital tokens to the third data file associated with the third user;

transmit to the third data file second information associated with the first portion of the first plurality of digital tokens, wherein the second information at least comprises an identity of the second user, an identity of the second data file, a reason of the requested transfer of the first portion data objects from the third data file, and a due date when the requested transfer is due;

receive the first portion of the digital tokens and the first portion of data objects at the second data file from the third data file, wherein the first portion of the digital tokens received from the third data file is a digital record of the transfer of the first portion of the data objects at the second data file; and in response to receiving the first portion of the digital tokens and the first portion of data objects at the second data file from the third data file, determine that the requested transfer of the first portion of the data objects has been completed.

* * * * *